United States Patent
Bobbitt, III et al.

(10) Patent No.: US 9,377,536 B1
(45) Date of Patent: Jun. 28, 2016

(54) RADIATION IMAGING SYSTEM

(71) Applicant: Savannah River Nuclear Solutions, LLC, Aiken, SC (US)

(72) Inventors: John T. Bobbitt, III, Evans, GA (US); David M. Immel, Augusta, GA (US); Matthew D. Folsom, Aiken, SC (US); Jean R. Plummer, Aiken, SC (US); Michael G. Serrato, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 15/042,185

(22) Filed: Feb. 12, 2016

Related U.S. Application Data

(63) Continuation of application No. 14/559,419, filed on Dec. 3, 2014, now Pat. No. 9,291,719.

(51) Int. Cl.
*G03B 42/00* (2006.01)
*G01T 1/00* (2006.01)

(52) U.S. Cl.
CPC .......................................... *G01T 1/00* (2013.01)

(58) Field of Classification Search
CPC .................................... G01T 1/00; G06T 1/00
USPC ...................................................... 250/475.2
See application file for complete search history.

(56) References Cited

U.S. PATENT DOCUMENTS

| | | | |
|---|---|---|---|
| 2005/0226609 A1* | 10/2005 | Suda ........................ | G02B 5/04 396/114 |
| 2012/0043471 A1 | 2/2012 | Harpring et al. | |
| 2012/0112099 A1* | 5/2012 | Coleman ................... | G01T 7/00 250/473.1 |

OTHER PUBLICATIONS

E.B. Farfan, D.M. Immel, M.H. Philips, J.T. Bobbitt and J.R. Plummer, Single-Faced GrayQb™ A Radiation Mapping Device, Dec. 12, 2013, SRNL-STI-2013-0654; published on the OSTI website http://www.osti.gov/scitech/biblio/1110810.

* cited by examiner

*Primary Examiner* — David Porta
*Assistant Examiner* — Meenakshi Sahu
(74) *Attorney, Agent, or Firm* — Dority & Manning, P.A.

(57) ABSTRACT

A radiation imaging system includes a casing and a camera disposed inside the casing. A first field of view through the casing exposes the camera to light from outside of the casing. An image plate is disposed inside the casing, and a second field of view through the casing to the image plate exposes the image plate to high-energy particles produced by a radioisotope outside of the casing. An optical reflector that is substantially transparent to the high-energy particles produced by the radioisotope is disposed with respect to the camera and the image plate to reflect light to the camera and to allow the high-energy particles produced by the radioisotope to pass through the optical reflector to the image plate.

18 Claims, 10 Drawing Sheets

RADIATION IMAGING SYSTEM

RELATED APPLICATIONS

The present application is a Continuation Application of U.S. patent application Ser. No. 14/559,419 filed on Dec. 3, 2014, and which is incorporated fully herein by reference in its entirety and for all purposes. Any disclaimer that may have occurred during prosecution of the above-referenced application is hereby expressly rescinded.

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present invention generally involves a system for imaging radiation, such as high-energy particles (e.g., x-rays or gamma rays) produced by a radioisotope. In particular embodiments, the system may overlay a radiation image with a still or video image to map radioisotopes in a particular area.

BACKGROUND OF THE INVENTION

The use of radioactive material may result in radiation and/or contamination areas in such areas as reactors, fuel and isotope processing facilities, laboratories, glove boxes, isolators, and other rooms in which the radioactive material is handled. The location and amount of the resulting radiation and contamination may initially be unknown. Although portable sensors are available to survey the radiation and contamination areas, these surveys necessarily expose the personnel conducting the surveys to potentially harmful levels of radiation and contamination. As a result, remote monitoring and characterization of the radiation and contamination areas may be used to reduce the risk of personal exposure to ionizing radiation during initial assessment, remediation, and long-term monitoring of the affected areas.

Various systems are available to assist in remotely monitoring radiation and contamination areas. In some systems, a sensor may be positioned in a suspected radiation or contamination area to detect and locate any ionizing radiation present. The sensor may be later retrieved, and the survey results may be manually plotted or overlaid on a diagram or photograph of the area to map the specific locations and levels of ionizing radiation found. In other systems, multiple separate sensors may be simultaneously or serially positioned in a suspected radiation or contamination area, with each sensor having a different sensitivity and range for detecting and measuring ionizing radiation. Alternately, a single sensor may be positioned in a suspected radiation or contamination area, and a series of surveys may be conducted with the sensor as the sensitivity and range of the sensor is adjusted to accurately detect and quantify the unknown level of ionizing radiation present.

The need exists for an improved system that may overcome one or more disadvantages of existing systems. For example, an improved system may allow a single sensor to simultaneously survey the radiation or contamination area while capturing still or video images of the area being surveyed so that the survey results may be directly mapped to the still or video images. Alternately, or in addition, an improved system may enhance modification of a sensor so a single sensor may conduct multiple surveys, with varying sensitivity and range limits, without adjusting the position of the sensor.

BRIEF DESCRIPTION OF THE INVENTION

Aspects and advantages of the invention are set forth below in the following description, or may be obvious from the description, or may be learned through practice of the invention.

One embodiment of the present invention is a radiation imaging system that includes a first casing and a camera disposed inside the first casing. A first field of view through the first casing to the camera exposes the camera to light from outside of the first casing. An image plate is disposed inside the first casing, and a second field of view through the first casing to the image plate exposes the image plate to high-energy particles produced by a radioisotope outside of the first casing. An optical reflector that is substantially transparent to the high-energy particles produced by the radioisotope is disposed with respect to the camera and the image plate to reflect light to the camera and to allow the high-energy particles produced by the radioisotope to pass through the optical reflector to the image plate.

An alternate embodiment of the present invention is a radiation imaging system that includes a first casing and a camera disposed inside the first casing. A first field of view through the first casing to the camera exposes the camera to light from outside of the first casing. An image plate holder is disposed at least partially inside the first casing, and an image plate is retained by the image plate holder inside the first casing. A second field of view through the first casing to the image plate exposes the image plate to high-energy particles produced by a radioisotope outside of the first casing. The system further includes an access port through the first casing, and the image plate holder fits through the access port.

A still further embodiment of the present invention is a radiation imaging system that includes a first casing and a camera disposed inside the first casing. A first field of view through the first casing to the camera exposes the camera to light from outside of the first casing. An image plate is disposed inside the first casing, and a second field of view through the first casing to the image plate exposes the image plate to high-energy particles produced by a radioisotope outside of the first casing. A focuser is inside the first casing. The system further includes an aperture through the focuser, and an insert in the aperture defines the second field of view.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
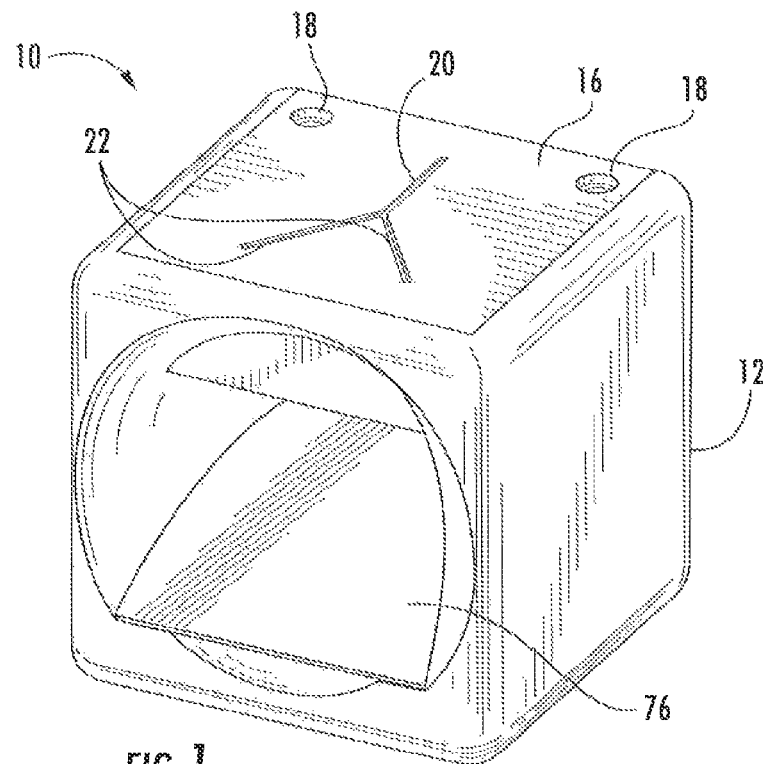
FIG. 1 is a front perspective view of a radiation imaging system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made to embodiments of the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a radiation imaging system. As used herein, "radiation" means high-energy particles, such as alpha particles, beta particles, neutrons, x-rays, gamma rays, or UV rays, produced by a radioisotope. Various embodiments of the system combine portability and flexibility in a single, cost-effective sensor suitable for use in diverse environments having widely varying space limitations and anticipated exposures.

FIGS. 1-4 provide perspective views of a radiation imaging system 10 according to one embodiment of the present invention. As shown in FIGS. 1-4, the system 10 generally includes a casing 12 that defines an interior volume 14 to shield internal components from exposure to contamination. The particular size and shape of the casing 12 may vary according to the anticipated environment and radiation level. For example, a larger casing generally provides a more stable platform that is less susceptible to inadvertent movement during or between surveys. In addition, a larger casing generally provides a correspondingly larger interior volume that may accommodate larger internal components and/or more internal shielding for the internal components, thus reducing the labor and costs associated with installing temporary shielding around the system 10. Conversely, a smaller casing may be more suitable for smaller environments, such as a glove box, or lower radiation level environments in which portability is more important than internal shielding. One of ordinary skill in the art will appreciate that the present invention is not limited to any particular size or shape for the casing 12 unless specifically recited in the claims.

In the particular embodiment shown in FIGS. 1-4, the casing 12 generally defines a 6-sided cube with a removable cover 16 that shields ambient light to the internal components while also providing enhanced access to the internal components. The cube shape enhances stability of the casing 12 by allowing the casing 12 to be positioned on any generally flat surface. The casing 12 may be constructed from plastic or metal, depending on weight, shielding, and durability considerations. In particular embodiments, the casing 12 may be a single-piece construction, such as through 3D printing. A single-piece construction reduces manufacturing costs while also providing enhanced strength, seamless construction for reduced light penetration, and improved internal tolerances compared to a multi-piece construction.

Figure 2:
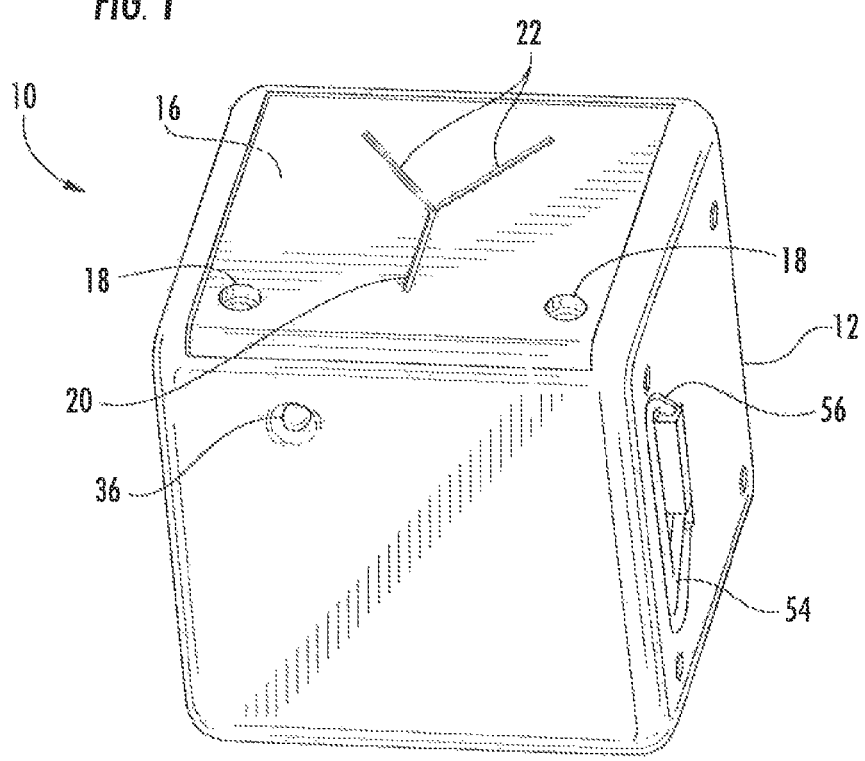
FIG. 2 is back perspective view of the system shown in FIG. 1.

As shown most clearly in FIGS. 1 and 2, the cover 16 may be connected to the casing 12 with one or more fasteners 18 to allow the cover 16 to be easily removed to facilitate access to components inside the casing 12. In addition, the cover 16 may include one or more indices to facilitate accurate alignment of the system 10 in the environment. For example, as shown in FIGS. 1 and 2, the cover 16 may include a single alignment index 20 that bisects the center of the cover 16 and extends from front to back to generally provide a reference for aiming the system 10 in the environment. Alternately, or in addition, the cover 16 may include a pair of field of view indices 22 that generally correspond to a field of view for the system 10, as will be explained in more detail.

Figure 3:
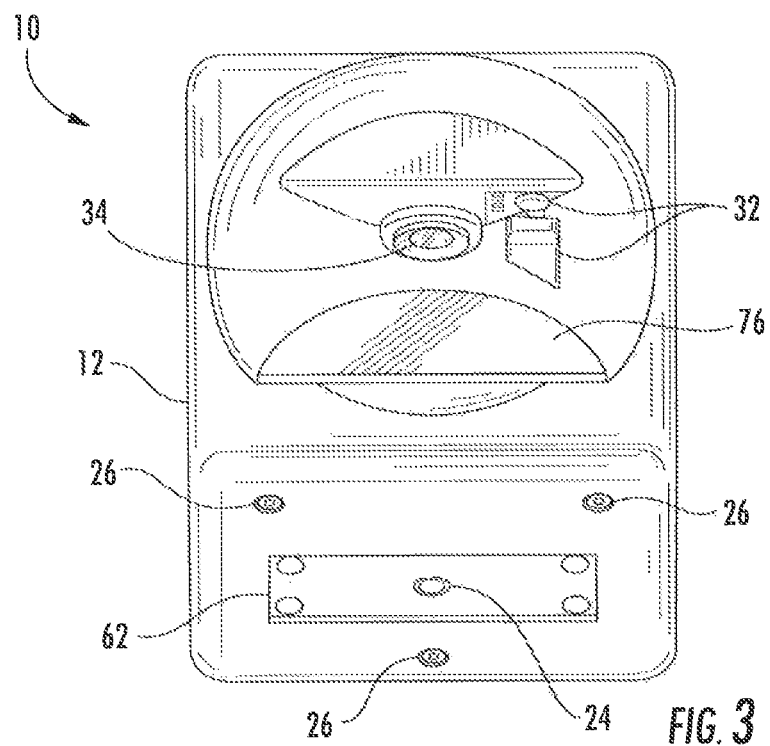
FIG. 3 is front-bottom perspective view of the system shown in FIG. 1.

As shown most clearly in FIG. 3, the bottom of the casing 12 may include one or more mounts for attaching the casing 12 to a tripod, legs, or other type of stand to elevate and stabilize the casing 12. For example, the casing 12 may include a tripod mount 24 with internal or external threads to attach the casing 12 to a conventional tripod commonly used with cameras. Alternately, or in addition, the casing 12 may include any number of foot mounts 26 with internal or external threads suitable for connecting the casing 12 to external feet or legs, as desired.

Figure 4:
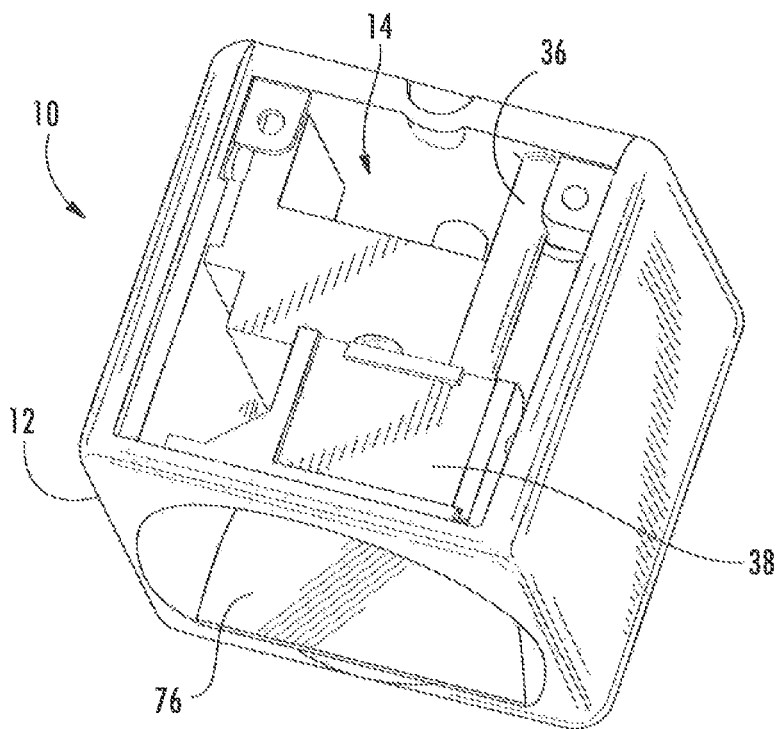
FIG. 4 is top perspective view of the system shown in FIG. 1 with the cover removed.
Figure 5:
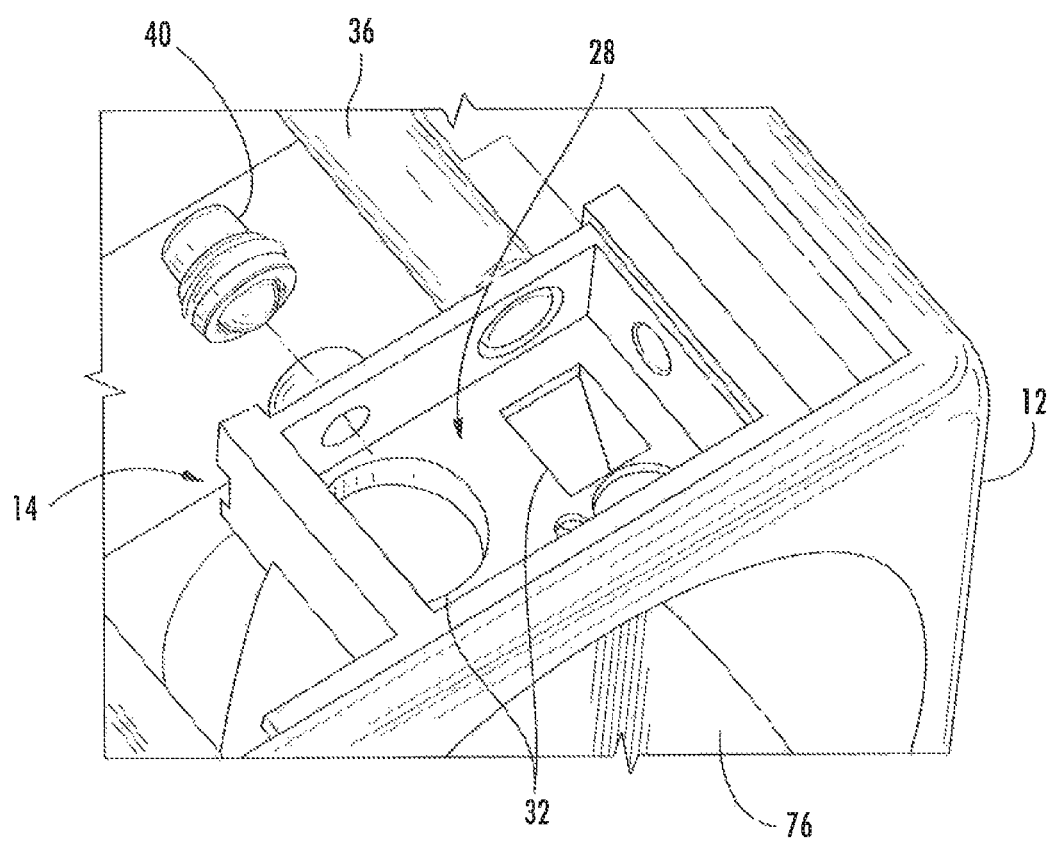
FIG. 5 is an enlarged perspective view of a portion of the system shown in FIG. 4.

FIG. 4 provides a top perspective view of the system 10 shown in FIG. 1 with the cover 16 removed, and FIG. 5 provides an enlarged perspective view of a portion of the system 10 shown in FIG. 4. As shown in FIGS. 3-5, the casing 12 may define a camera receptacle 28 in the interior volume 14 that can receive and hold a camera 30 capable of recording still or video images. A suitable camera 30 within the scope of various embodiments of the present invention may be a GoPro® Hero3 camera, although the present invention is not limited to any particular camera. Referring to FIGS. 3 and 5, the casing 12 may further define one or more optical openings 32 through the casing 12 to allow a camera lens 34 and/or camera sensors, such as light and distance sensors, to see through the casing 12. As shown in FIGS. 2, 4 and 5, a shutter button 36 may be operably connected to the camera 30 and extend outside the casing 12. In this manner, the casing 12 may protect the camera 30 from contamination present in the environment, and the shutter button 36 allows for optional manual operation of the camera 30 from outside the casing 12.

As will be described, consistent alignment of the camera 30 with respect to other internal components will assist in accurately mapping the survey results onto still or video images. As a result, the system 10 may include additional internal components to protect and hold the camera 30 in position without increasing the manufacturing costs normally associated with achieving comparable tolerances. For example, as shown in FIG. 4, the system 10 may include a camera cover 38 that fits on top of the camera 30 inside the casing 12 to protect the camera 30 from inadvertent contact and restrain the camera 30 from vertical movement inside the casing 12. Alternately, or in addition, the system 10 may include a camera detent 40, spring, or other press fitting between the casing 12 and the camera 30 to restrain the camera 30 from longitudinal or lateral movement inside the casing 12.

Figure 6:
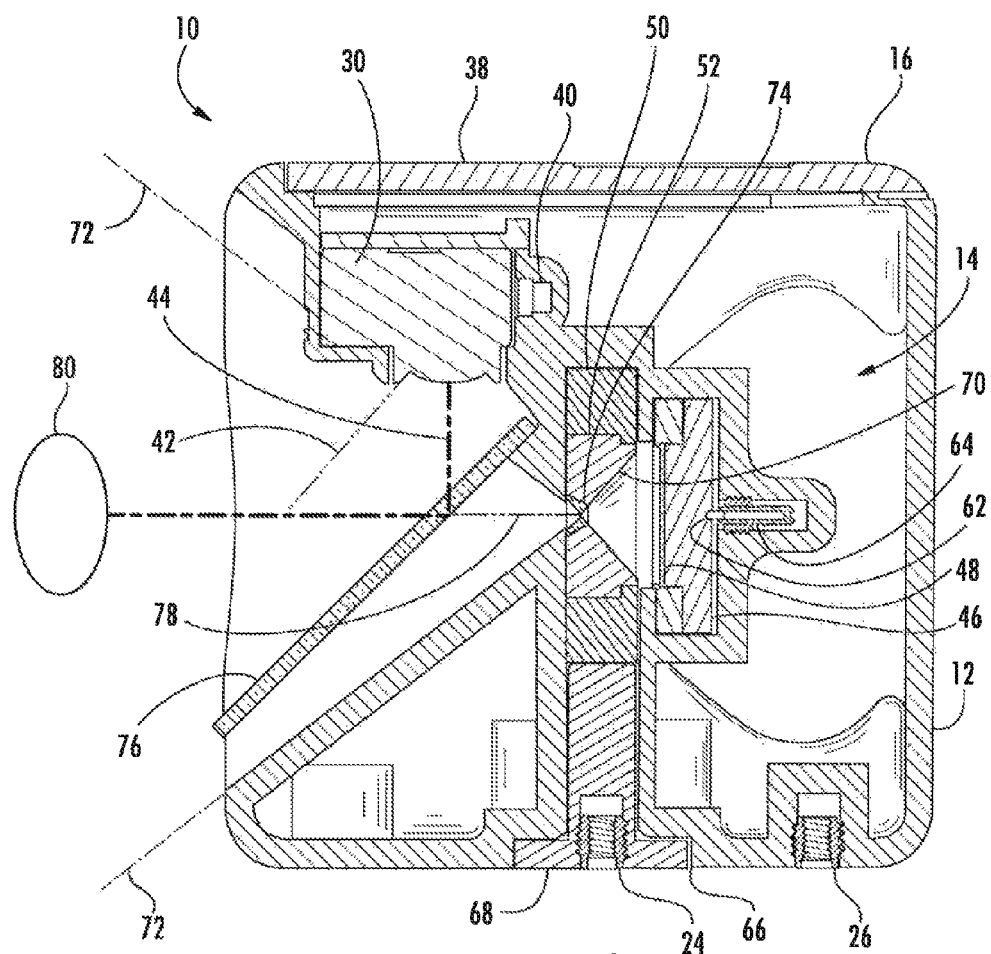
FIG. 6 is a side cross-section view of the system shown in FIG. 1.
Figure 7:
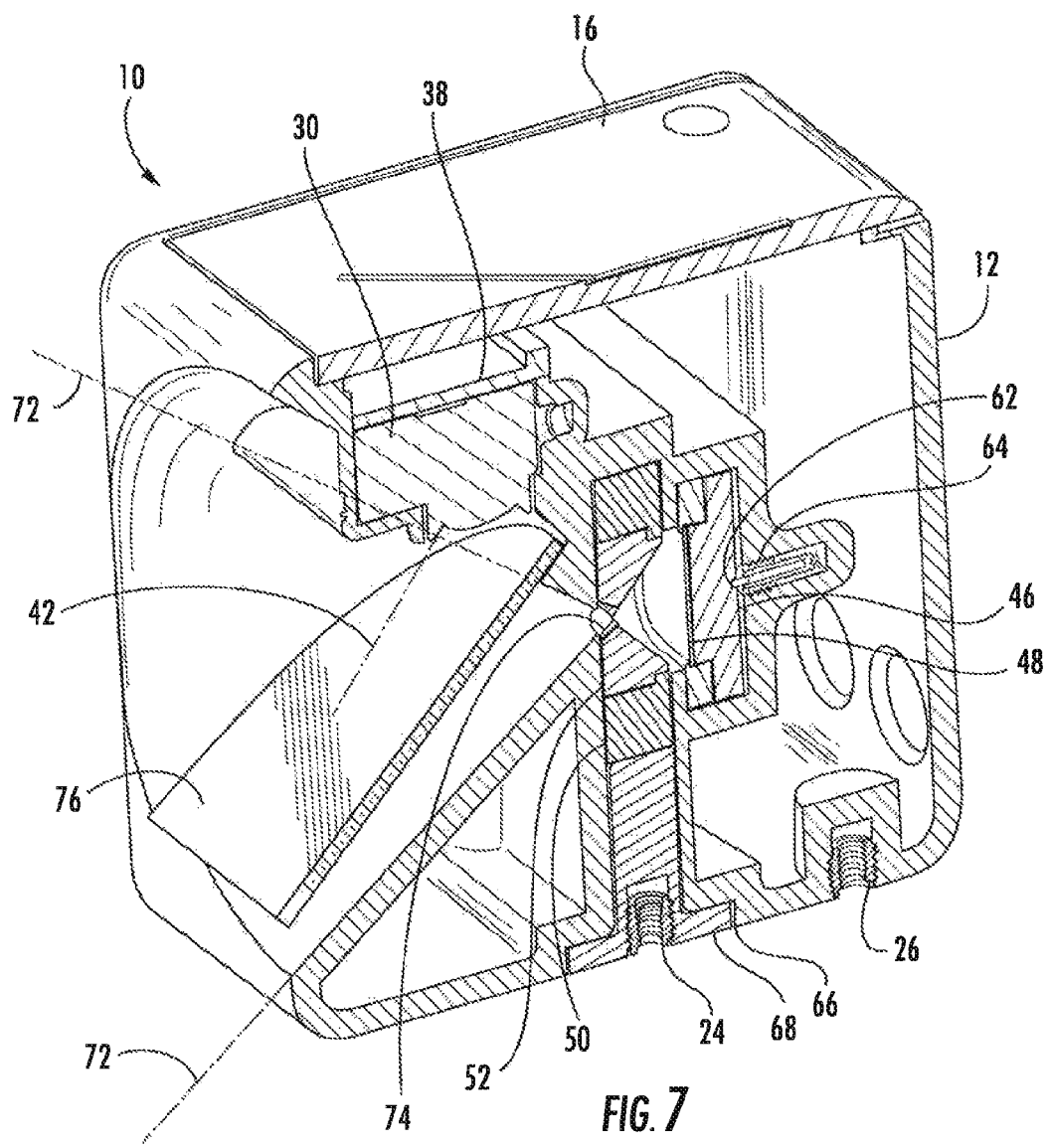
FIG. 7 is a side perspective cross-section view of the system shown in FIG. 1.

FIG. 6 provides a side cross-section view of the system 10 shown in FIG. 1, and FIG. 7 provides a side perspective cross-section view of the system 10 shown in FIG. 1. As shown in FIGS. 6 and 7, the camera 30 is positioned inside the casing 12 so that the camera lens 34 generally faces downward. As a result, a field of view 42 through the casing 12 to the camera 30 exposes the camera 30 to light 44 from outside of the casing 12. FIGS. 6 and 7 also show various views of an image plate holder 46 and an image plate 48, as will be described in more detail with respect to FIGS. 8 and 9, and a focuser holder 50 and a focuser 52, as will be described in more detail with respect to FIGS. 10-12.

Figure 8:
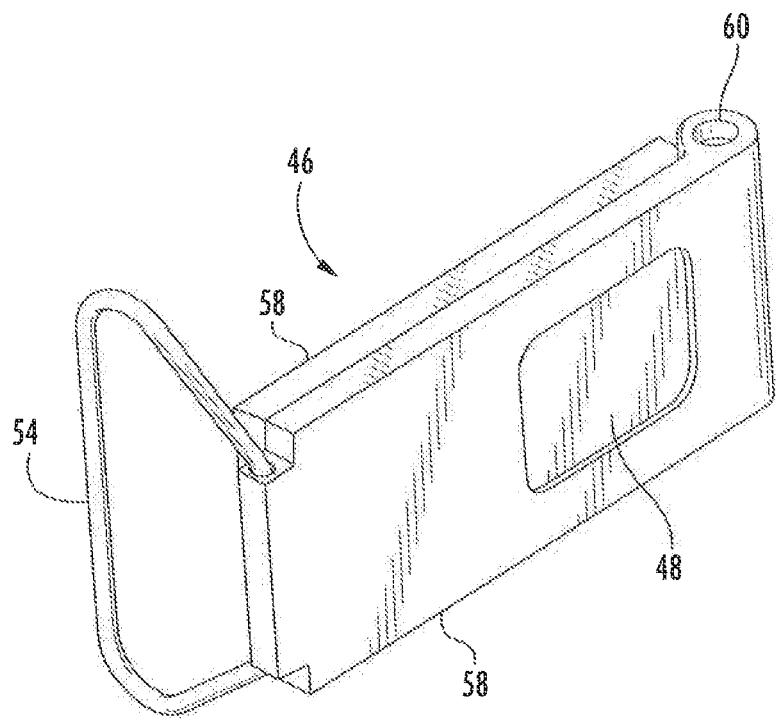
FIG. 8 is a perspective view of an image plate holder and image plate according to one embodiment of the present invention.
Figure 9:
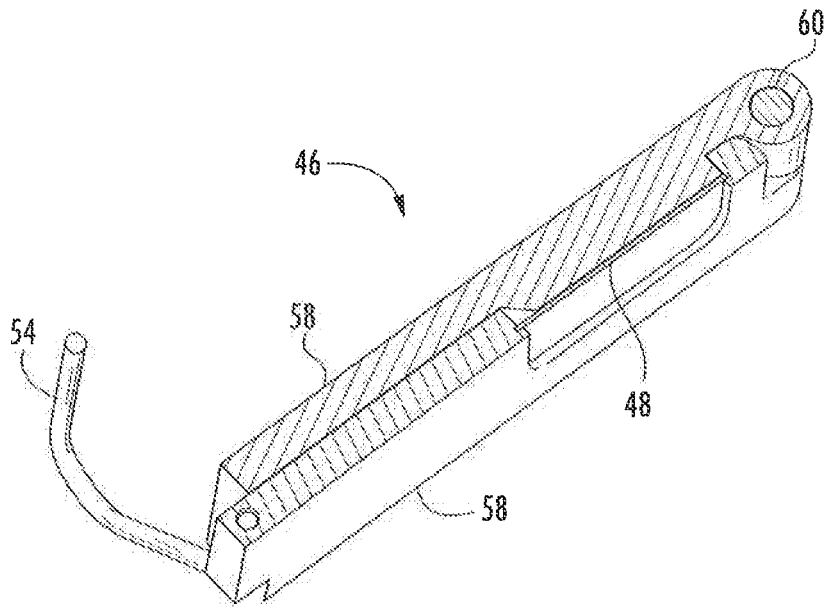
FIG. 9 is a perspective cross-section view of the image plate holder and image plate shown in FIG. 8.

FIG. 8 provides a perspective view of the image plate holder 46 and image plate 48 according to one embodiment of the present invention, and FIG. 9 provides a perspective cross-section view of the image plate holder 46 and image plate 48 shown in FIG. 8. As shown in FIGS. 8 and 9, the image plate holder 46 provides a storage cartridge for the image plate 48 to facilitate installation and removal of the image plate holder 46 and image plate 48 with respect to the casing 12. A handle 54 may be operably connected to the image plate holder 46, and, as shown in FIG. 2, an access port 56 into the casing 12 may allow the image plate holder 46 and image plate 48 to fit through the access port 56 and into the casing 12, with the handle 54 extending at least partially outside of the casing 12. In this manner, installation and removal of the image plate holder 46 and image plate 48 with respect to the casing 12 may be accomplished during repetitive surveys without disturbing the position of the system 10 in the environment.

The actual size and construction of the image plate holder 46 may vary according to the particular casing 12 design and characteristics of the particular image plate 48 being used. For example, the image plate 48 may include one or more radiation sensitive film layers sandwiched between attenuation layers. The geometry, number, and thickness of the film layers and attenuation layers may be selected based on the anticipated source and/or energy level present in the radiation. In particular embodiments, for example, the film layers may include x-ray imaging photographic film used in conventional medical applications. Alternately or in addition, the film layers may include Phosphorous Storage Plate (PSP) technology as described in U.S. Patent Publication 2012/0112099 and assigned to the same assignee as the present application, the entirety of which is incorporated herein for all purposes. The attenuation layers may be similarly selected to partially shield radiation that passes through the film layers. Suitable attenuation layers may include, for example, metal, plastic, or glass, depending on the anticipated source and/or energy level present.

The attenuation layers produce a different exposure for each film layer exposed to radiation. For example, radiation exposed to the image plate 48 will produce the largest exposure in the outermost film layer, with progressively decreasing exposures to each interior film layer, depending on the particular attenuation layer between each film layer. The number of film layers and attenuation coefficients for the attenuation layers may be varied as desired to achieve a desired sensitivity to radiation and/or discrimination of different energy levels. After an exposure to radiation, the image plate 48 may be removed from the casing 12 and image plate holder 46 for analysis, and the amount and/or energy level of the radiation present may be calculated based on the known attenuation layers and different exposures received by each film layer.

The image plate holder 46 may be constructed from tungsten, copper, lead, aluminum, aluminum alloys, plastic, or other material that may supplement the shielding around the image plate 46. The thickness of the image plate holder 46 may be selected or adjusted to accommodate the thickness of the image plate 48 while still holding the image plate 48 in the desired geometry with respect to the focuser 52 to produce the desired focus and size on the image plate 48. For example, referring again to FIGS. 8 and 9, the image plate holder 46 may include two complementary sections 58 connected by a hinge 60, with the thickness of the sections 60 selected to hold the image plate 48 securely in place. The image plate holder 46 may further include a locating index 62 (shown in FIGS. 6 and 7) that engages with a complementary image plate detent 64, spring, or other press fitting between the casing 12 and the image plate holder 46 or image plate 48 to provide a positive indication that the image plate holder 46 is fully and properly installed inside the casing 12.

Figure 10:
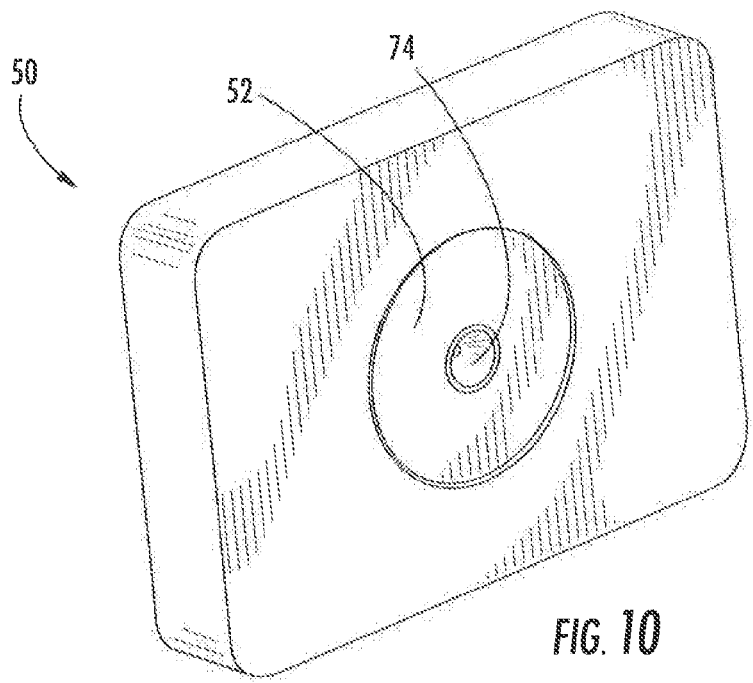
FIG. 10 is a front perspective view of a focuser holder and focuser according to one embodiment of the present invention.
Figure 11:
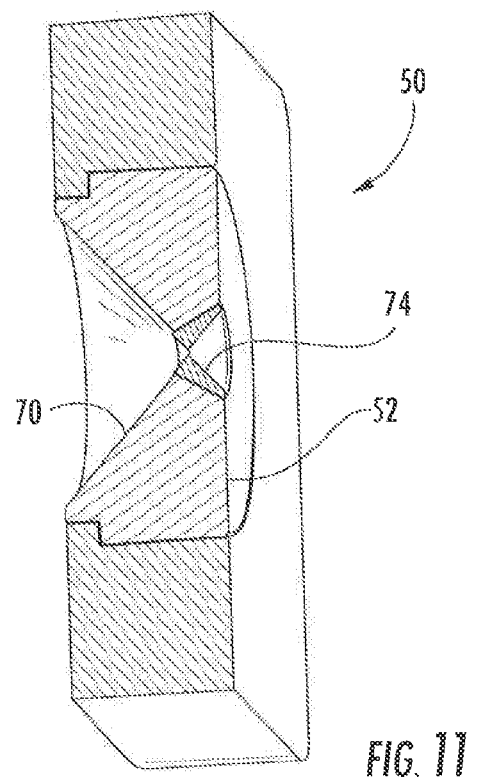
FIG. 11 is a side perspective cross-section view of the focuser holder and focuser shown in FIG. 10.

FIG. 10 provides a front perspective view of the focuser holder 50 and focuser 52 according to one embodiment of the present invention, and FIG. 11 provides a side perspective cross-section view of the focuser holder 50 and focuser 52 shown in FIG. 10. As shown in FIGS. 10 and 11, the focuser holder 50 provides a storage cartridge for the focuser 52 to facilitate installation and removal of the focuser holder 50 and focuser 52. As shown in FIGS. 3, 6, and 7, an access port 66 into the casing 12 may allow the focuser holder 50 and focuser 52 to fit through the access port 66 and into the casing 12. A focuser bias 68, shim, plug, spring, or other press fitting may then be installed in the access port 66 to hold the focuser holder 50 and focuser 52 securely in place, as shown in FIGS. 6 and 7.

Figure 12:
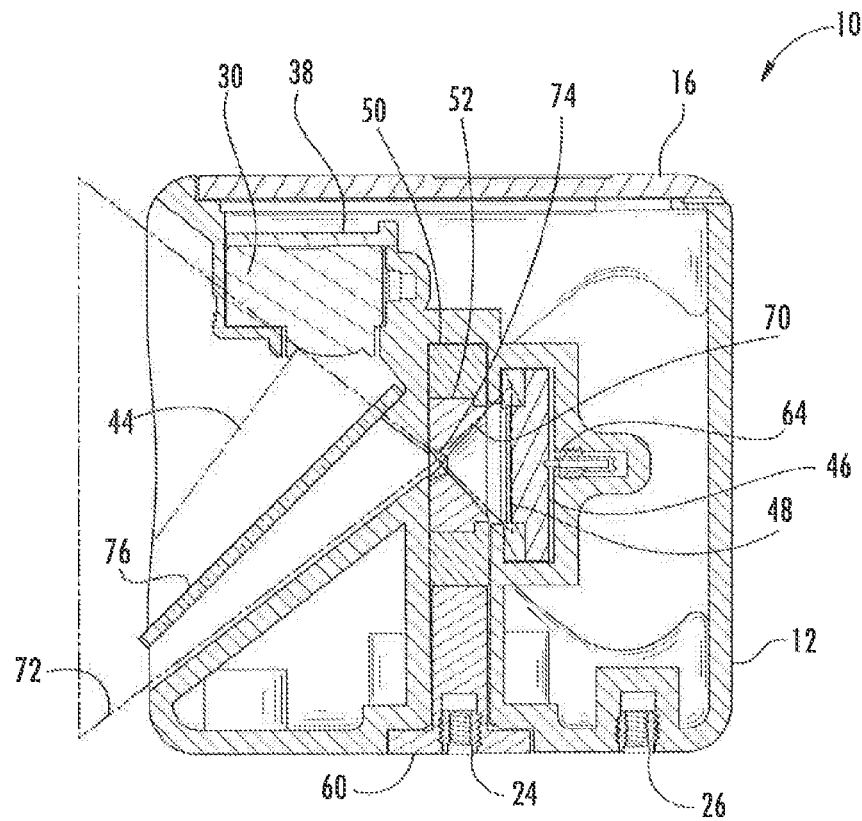
FIG. 12 is a side cross-section view of the system shown in FIG. 1 with the focuser holder and focuser shown in FIG. 10.

FIG. 12 provides a side cross-section view of the system 10 shown in FIG. 1 with the focuser 52 shown in FIG. 10. As shown in FIGS. 10-12, a conical aperture 70 through the focuser 52 defines a field of view 72 to the image plate 48, and the focuser holder 50 and focuser 52 combine to shield the image plate 48 from radiation outside of the field of view 72. The size and geometry of the aperture 70 and resulting field of view 72 with respect to the image plate 48 may be selected based on the anticipated amount and/or energy level of the radiation present. For example, increasing the size or conical angle of the aperture 70 increases the field of view 72 through the focuser 52 to the image plate 48. A larger field of view 72 allows a larger area to be surveyed with each exposure and also allows more radiation to reach the image plate 48, effectively increasing the sensitivity of the system 10 to lower radiation levels. The larger field of view 72, however, may also result in images that are blurred or less defined, especially when higher levels of radiation are present. A larger distance between the aperture 70 and the image plate 48 generally increases spatial resolution and enhances definition in the image.

In particular embodiments, the focuser holder 50 and focuser 52 may be a single, integral piece. Alternately, the focuser holder 50 and focuser 52 may be separate components, as shown in FIGS. 6, 7, 10, and 11, allowing the focuser holder 50 to be used with multiple different focusers 52 having different size apertures 70 and/or numbers of apertures 70. In still further embodiments, the focuser 52 may include an insert 74 in the aperture 70 that further narrows or defines the field of view 72 to the image plate 48. The focuser holder 50, focuser 52, and insert 74 may be constructed from tungsten, copper, lead, aluminum, aluminum alloys, plastic, or other material suitable for shielding the radiation present. The thickness of the focuser holder 50 may be selected or adjusted based on the shielding desired for the anticipated radiation levels. Alternately or in addition, the thickness of the focuser holder 50 may be selected or adjusted to accommodate the thickness of the focuser 52, and insert 74 if present, while still holding the focuser 52 in the desired geometry with respect to the image plate 48 to produce the desired focus and size on the image plate 48. The use of different focusers 52 having different sized apertures 70 and/or different inserts 74 used with the same aperture 70 thus allow the size and geometry of the aperture 70 and resulting field of view to be easily adjusted according to the anticipated amount and/or energy level of the radiation present.

The interaction between the camera 30, image plate 48, and focuser 52 will now be described with respect to FIGS. 6 and 7. As shown in FIGS. 6 and 7, the field of view 42 for the camera 30 is generally vertical, and the field of view 72 through the focuser 52 is generally horizontal, making the two fields of view 42, 72 substantially perpendicular to one another. An optical reflector 76 that is substantially transparent to high energy particles 78 produced by a radioisotope 80 is disposed with respect to the camera 30 and the image plate 48. The optical reflector 76 may be, for example, a mirror made from glass, plastic, Mylar, or another suitable material that reflects light 44 but is transparent to high energy particles 78. The optical reflector 76 is positioned to reflect light 44 to the camera 30 while also allowing high-energy particles 78 produced by the radioisotope 80 to pass through the optical reflector 76 to the image plate 48. The optical reflector 76 thus reflects the field of view 42 for the camera 30 to be coaxial with the field of view 72 for the image plate 48. In this manner, the optical reflector 76 removes any parallax error between the camera 30 and the image plate 48 to allow the image produced by the image plate 48 to be more accurately overlaid on the still or video images produced by the camera 30.

Figure 13:
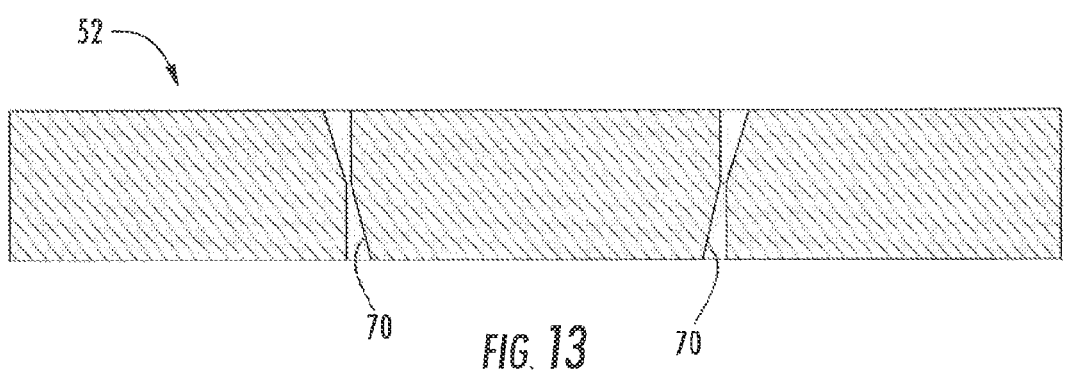
FIG. 13 is a side cross-section view of a focuser according to an alternate embodiment of the present invention.

FIG. 13 provides a side cross-section view of a focuser 52 according to an alternate embodiment of the present invention. In this particular embodiment, the focuser 52 includes a plurality of conical apertures 70 through the focuser 52 that define a corresponding number of fields of view 72 to the image plate 48. The additional apertures 72 and relatively narrow conical angle of each aperture 72 allow each field of view to capture a different portion of the area being surveyed. In this manner, the focuser 52 blocks radiation from reaching the image plate 48 except through the narrow conical angle of each aperture 72. As a result, this embodiment may be particularly suitable to allow high energy imaging of a large composite view in anticipated high radiation environments.

Figure 14:
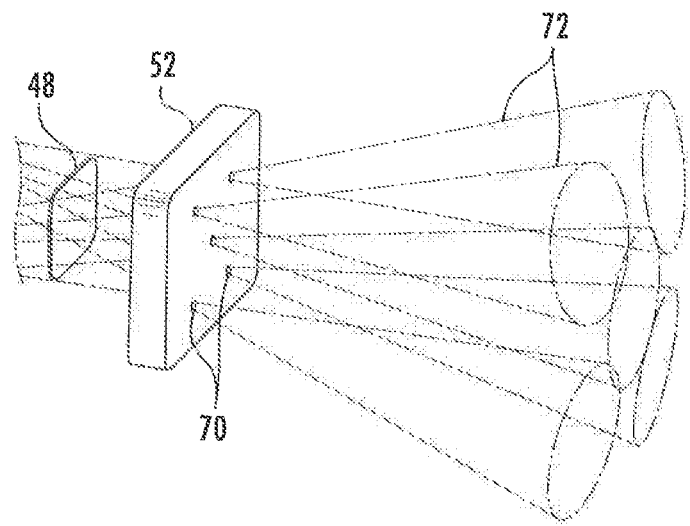
FIG. 14 is a representative perspective view of a focuser and image plate according to an embodiment of the present invention.
Figure 15:
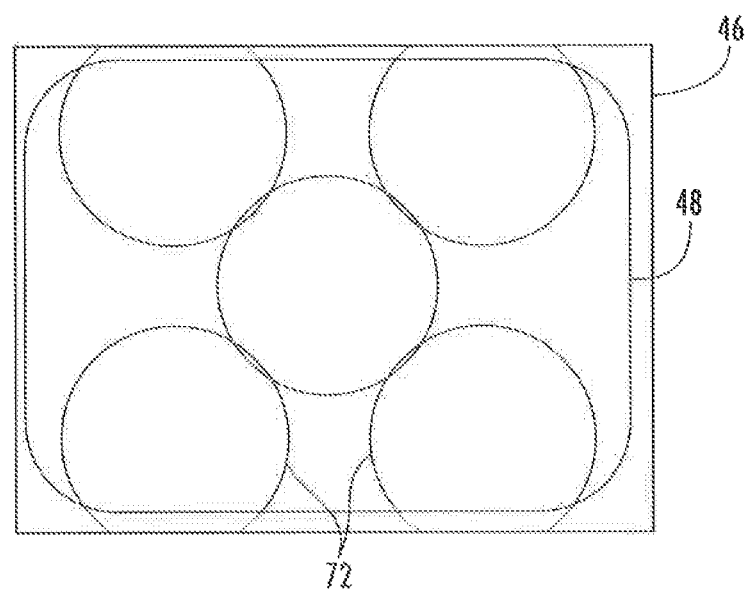
FIG. 15 is a representative illustration of multiple images on an image plate according to an embodiment of the present invention.

FIG. 14 provides an exemplary perspective view of a multi-aperture focuser 52, as shown in FIG. 13, and image plate 48 according to an embodiment of the present invention, and FIG. 15 provides an exemplary illustration of multiple images on the image plate 48 that might result from such an embodiment. As shown in FIG. 14, each aperture 70 produces a separate field of view 72 to the image plate, with each field of view capturing a separate portion of the environment. As shown in FIG. 15, the angle of the apertures 70 direct the field of view to separate locations on the image plate 48, producing a composite of images based on each field of view 72. As a result, this particular embodiment may be useful, for example, when the area being surveyed is particularly large, includes high radiation levels, or includes multiple different radiation sources.

Figure 16:
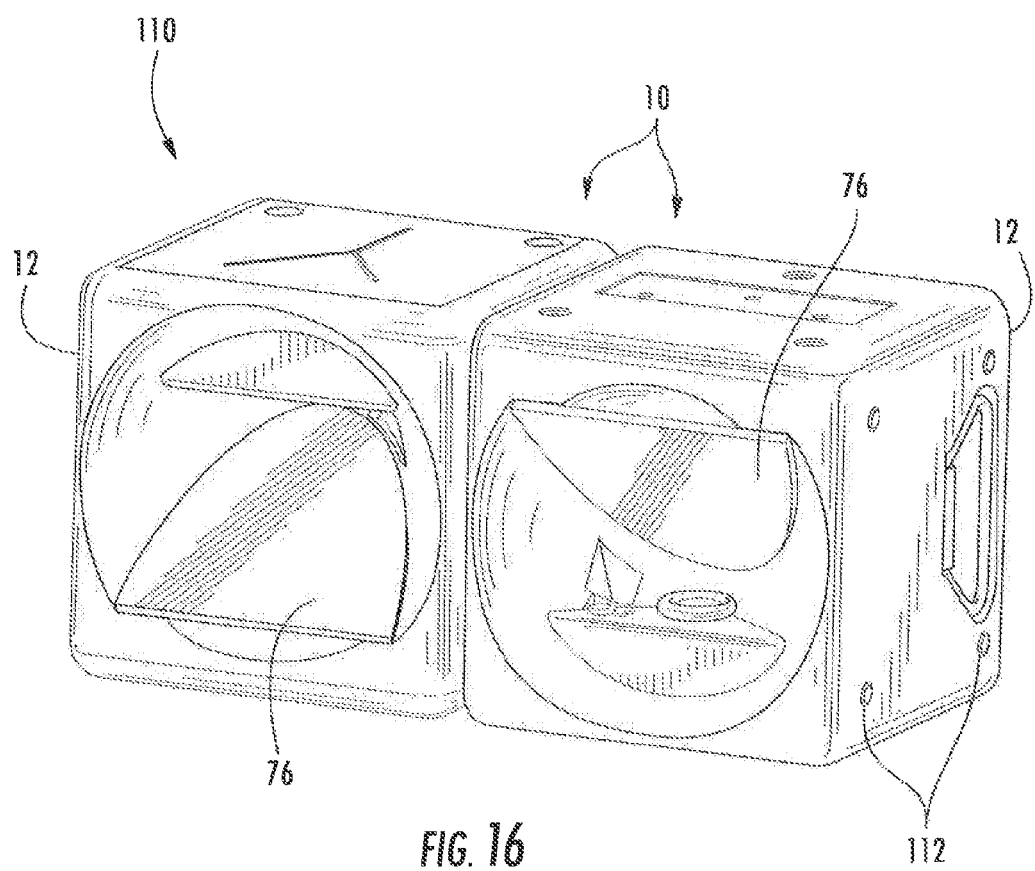
FIG. 16 is a perspective view of a radiation imaging system according to an alternate embodiment of the present invention.

FIG. 16 provides a perspective view of a radiation imaging system 110 according to an alternate embodiment of the present invention. As shown in FIG. 16, the system 110 generally includes multiple systems 10 previously described with respect to FIGS. 1-15. The casing 12 for each system 10 includes means for releasably attaching one casing 12 to another casing 12. The structure for releasably attaching one casing 12 to another casing 12 may be, for example, magnets, hook and loop fasteners, snaps, bolts, screws, or any other mechanical device known in the art for mechanically connecting one object to another. As a result, the system 110 shown in FIG. 16 may be used to cover a larger area during a single survey. Alternately, or in addition, multiple images generated from this system 110 may be used to produce a 3-dimensional map of the survey area.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A radiation imaging system, comprising:
a first casing;
a camera disposed inside said first casing;
a first field of view through said first casing to said camera, wherein said first field of view exposes said camera to light from outside of said first casing;
an image plate disposed inside said first casing; and
a second field of view through said first casing to said image plate, wherein said second field of view is substantially perpendicular to said first field of view and exposes said image plate to high-energy particles produced by a radioisotope outside of said first casing.

2. The system as in claim 1, further comprising a camera detent between said first casing and said camera.

3. The system as in claim 1, further comprising an access port into said first casing, wherein said image plate fits through said access port.

4. The system as in claim 1, further comprising an image plate detent between said first casing and said image plate.

5. The system as in claim 1, further comprising a focuser inside said first casing, and a conical aperture through said focuser that defines said second field of view.

6. The system as in claim 1, further comprising a focuser inside said first casing, an aperture through said focuser, and an insert in said aperture that defines said second field of view.

7. The system as in claim 1, further comprising means for releasably attaching said first casing to a second casing.

8. A radiation imaging system, comprising:
a first casing;
a camera disposed inside said first casing;
a first field of view through said first casing to said camera, wherein said first field of view exposes said camera to light from outside of said first casing;
an image plate holder disposed at least partially inside said first casing;
an image plate retained by said image plate holder inside said first casing;
a second field of view through said first casing to said image plate, wherein said second field of view exposes said image plate to high-energy particles energy from an object of interest outside of said first casing; and
a handle operably connected to said image plate holder, wherein said handle extends at least partially outside of said first casing.

9. The system as in claim 8, further comprising an optical reflector that is substantially transparent to the high-energy particles produced by the object of interest, wherein said optical reflector is disposed with respect to said camera and said image plate to reflect light to said camera and to allow the high-energy particles produced by the object of interest to pass through said optical reflector to said image plate.

10. The system as in claim 8, wherein said first field of view is substantially perpendicular to said second field of view.

11. The system as in claim 8, further comprising a focuser inside said first casing, an aperture through said focuser, and an insert in said aperture that defines said second field of view.

12. The system as in claim 8, further comprising means for attaching said first casing to a second casing.

13. A radiation imaging system, comprising:
a first casing;
a camera disposed inside said first casing;
a first field of view through said first casing to said camera, wherein said first field of view exposes said camera to light from outside of said first casing;
an image plate disposed inside said first casing; and
a second field of view through said first casing to said image plate, wherein said second field of view exposes said image plate to energy emitted from an object of interest outside of said first casing.

14. The system as in claim 13, wherein said first field of view is substantially perpendicular to said second field of view.

15. The system as in claim 13, further comprising a camera detent between said first casing and said camera.

16. The system as in claim 13, further comprising an access port through said first casing, wherein said image plate fits through said access port.

17. The system as in claim 13, further comprising an image plate holder disposed at least partially inside said first casing, wherein said image plate is retained by said image plate holder inside said first casing.

18. The system as in claim 13, further comprising means for attaching said first casing to a second casing.

\* \* \* \* \*